United States Patent [19]

McKune et al.

[11] Patent Number: 4,991,529
[45] Date of Patent: Feb. 12, 1991

[54] SLURRY DISPENSER

[75] Inventors: John W. McKune; Arnold O. Musolf, both of Glendora; Timothy W. Hales, Redlands; Eric D. Swanson, Sunset Beach, all of Calif.

[73] Assignee: The United States of America as represented by the Secretary of the Navy, Washington, D.C.

[21] Appl. No.: 230,543

[22] Filed: Feb. 28, 1972

[51] Int. Cl.$^5$ .......................... B63B 1/34; B05B 7/00
[52] U.S. Cl. ................................. 114/67 R; 222/630
[58] Field of Search ...................... 114/16, 67 R, 67 A, 114/232, 233, 20 R, 20 A, 312; 222/193, 630

[56]  References Cited

U.S. PATENT DOCUMENTS 3,367,542  2/1968  Madison ...................... 114/67 R X
3,392,693  7/1968  Hulsebos et al. ............. 114/67 R X
3,435,796  4/1969  Merrill .............................. 114/67 R
3,516,376  6/1970  Kowalski ........................ 114/67 R Primary Examiner—Charles T. Jordan
Attorney, Agent, or Firm—Harvey Fendelman; Thomas Glenn Keough; Ervin F. Johnston

[57] ABSTRACT

A dispenser for ejecting slurry into a liquid stream so that optimum mixing is attained. This dispenser may include an elongated body having nose and main sections, the forward end of the main body section having an annular slurry receiving cavity which is located adjacent the nose. Means are provided for mounting the nose to the main body section for longitudinal movement so as to open and close the annular cavity to the liquid stream. In this manner the slurry can be ejected and dispersed into the liquid stream when the annular cavity is opened thereto. In order to obtain controlled mixing the dispenser may further include a conduit in which the elongated body is disposed.

12 Claims, 1 Drawing Sheet

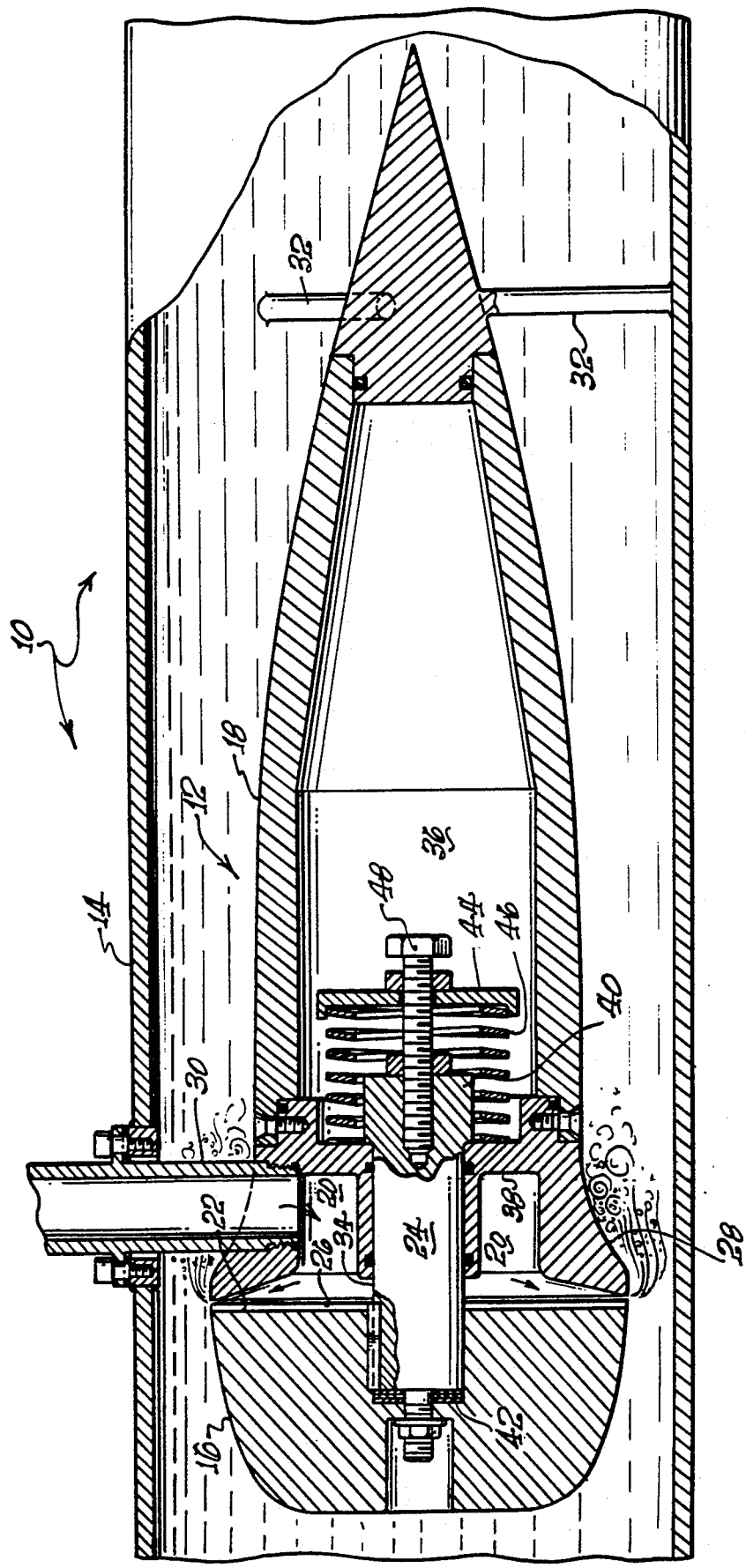

SLURRY DISPENSER

BACKGROUND OF THE INVENTION

It is well known that drag of a ship or submarine through the water can be significantly reduced by ejecting a polymer solution over the exterior of the vessel. Polymer solutions must be mixed in extensive quantities in order to achieve this purpose. Present methods for mixing polymer solutions normally use either a powder mixer or a venturi-type slurry dispenser. In the powder mixer a dry polymer powder is metered into a large surface area of water, after which the powder and water are turbulently mixed to provide the polymer solution. This type of mixing tends to form gelatinous lumps in the polymer solution, and continuous maintenance and cleaning are required. Further, this type of mixing is not suitable for shipboard or submarine use because air, usually atmospheric pressure, is required and this pressure is less than the hydrostatic pressure at the polymer solution outlet over the exterior surface of the vessel.

Present day slurry dispensers operate by injecting a highly viscous slurry into a highly turbulent stream of water. The slurrly is typically pumped or forced through a small orifice, usually about $\frac{1}{8}''$ in diameter, into the throat of a venturi dispenser. Mixing is accomplished by maintaining a large difference in velocity between the slurry and the water. This dispenser, which has mixing capabilities of around 600 gpm, can operate in a submerged environment since no air is required. However, this type of mixing has several serious drawbacks, a primary one being clogging at the orifice due to synaresis which is a phenomenon where the powder separates from the liquid carrier when accelerated because of constrictions and results in deposits at the constrictions. This type of dispenser also requires a very clean slurry and a shut-off valve for the slurry at the throat of the venturi dispenser. Also, it can be visualized that because of the localized injection of the slurry the dispersion thereof will be less than that desired. Both the powder mixer and the presently existing slurry dispensers are large units and somewhat expensive to fabricate.

SUMMARY OF THE INVENTION

The present invention provides a slurry dispenser which overcomes the aforementioned associated with prior art devices. The present invention injects a high-speed thin annular sheet of polymer slurry radially within a liquid stream, such as a stream within a conduit. This has been accomplished by providing an elongated body having nose and main sections, the forward end of the main body section having an annular slurry receiving cavity which is located adjacent to the nose. Means are provided for mounting the nose to the main body section for longitudinal movement so as to open and close the annular cavity to the liquid stream. When the nose section is open, the annular sheet of polymer slurry is ejected radially. When the body is centrally mounted within a conduit controlled mixing is accomplished by dispersion of the slurry within the stream. By appropriate configuration of the body within the conduit mixing is enhanced and the results are that extremely large quantities of polymer slurry can be dispersed to a liquid stream to produce a polymer solution. This polmer solution can be ejected over the exterior surface of an ocean going vessel to significantly reduce drag.

OBJECTS OF THE INVENTION

An object of the present invention is to provide a slurry dispenser which overcomes the aforementioned problems associated with prior art devices.

Another object is to provide an inexpensive, compact slurry dispenser which is capable of mixing large quantities of slurry with a liquid in a submerged environment without undue risk of clogging.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a longitudinal cross-sectional view of the present invention.

DESCRIPTION OF THE PREFERRED EMBODIMENT

Referring now to the drawing, there is shown an exemplary slurry dispenser 10 which may include an elongated body 12 which is mounted in a liquid stream within a conduit 14. The elongated body 12 has a nose 16 and main body section 18. The forward end of the main body section 18 may have an annular slurry receiving cavity 20 which is located adjacent and immediately aft of the nose 16. The nose 16 may have a flat after wall 22 which engages a forward circumference of the main body section 18.

Means, generally shown at 24, may be utilized for mounting the nose 16 to the main body section 18 for longitudinal movement so as to open and close the annular cavity 20 to the liquid stream. The nose 16 is shown in the drawing in the open position. A rubber gasket 26 is preferably bonded to the aft wall 22 of the nose 16 so as to seal off the flow of slurry when the nose is in a closed position. The slurry cavity 20 gradually increases in size toward the nose so that just a thin forward circumferential area of the main body section 18 makes sealing engagement with the gasket 26. In this manner the slurry is really channeled toward the annular opening so that the slurry is ejected as a thin annular sheet into the liquid stream. The configuration is especially efficient in handling polymer slurries.

In order to enhance mixing of the annular sheet of slurry the main body section may be provided annular exterior step decrease 28 substantially immediately aft of the nose 16 so as to cause turbulence in the liquid stream. The annular sheet of slurry is caught up in this turbulence and rapidly and thoroughly mixed in the liquid. Immediately aft of the step decrease 28 to the main body section 18 may gradually decrease in size so as to act as diffuser for recovering a portion of the head lost at the step increase 28.

The slurry may be delivered to the annular cavity 20 by a delivery tube 30. The delivery tube 30 may also mount the body 12 axially within the conduit 14 by rigid mountings to both the conduit 14 and the main body section 18. The slurry is normally fed through the tube 30 under pressure and may be accomplished by a slurry head or a pump. At the aft end of the main body section 18 struts 32 (one shown in the drawing) may be fixedly attached thereto as well as the conduit 18 for further mounting of the body 12 within the conduit.

The mounting means 24 may include a shaft 34 which is rigidly and axially mounted to the nose 16 so as to extend aft into the main body section 18. The main body section 18 may have an aft chamber 36 which is divided from the annular slurry receiving cavity 20 by an interior transverse partition 38. The shaft 34 slidably and sealably extends through the partition 38 and has an enlarged aft end abutment 40 for engaging the aft wall of the partition 38. In this manner, the abutment 40 will stop forward movement of the nose 16 at a predetermined open cavity position. The degree of opening will be determined by the number and thickness of a plurality of shims 42 at the forward end of the shaft 34.

When it is desired to open the nose 16 with respect to the main body section 18 by pressure of the slurry within the cavity 20 a transverse plate 44 may be spaced from the aft end of the aburtment 40, and a compression spring 46 may be disposed there between. A bolt 48 may be threaded through the plate 44 into the aft end of the abutment for selectively adjusting the pressure required to force the nose forward and open the annular slurry receiving cavity 20. With this arrangement the nose 16 will open so as to enable ejection of the slurry when the pressure of the slurry within the annular cavity 20 is greater than the pressure of the spring 46 and pressure of the liquid stream upon the nose 16. If desired an electrically or hydraulically means could be provided in lieu of the plate 44 and spring 46 arrangement so as to positively act on the shaft 34 to open and close the nose 16 at desired times.

OPERATION AND METHOD OF THE INVENTION

In the operation of the preferred embodiment slurry, such as polymer slurry, is introduced in the delivery tube 30 under pressure into the annular receiving cavity 20. When the slurry pressure within the cavity 20 exceeds the spring force 46 and stream pressure on the nose 16 the nose 16 will open, as shown in the figure, to eject a thin high velocity annular sheet of polymer slurry into the liquid stream within the conduit 14. This sheet of polymer slurry is quickly caught up with the stream and turbulently mixed in the proximity of the step decrease 28, after which now the mixed slurry liquid stream solution recovers its head along the diffuser portion of the main body section 18. When it is desired to increase the slurry pressure within the cavity 20 at which the nose 16 will open the bolt 48 is tightened so as to increase the pressure of the spring 46. Further, additional shims 42 are inserted if a greater sized annular opening is required for ejecting the slurry. At some downstream location within the conduit 14 the highly mixed slurry solution may be utilized for ejection over the exterior surface of an ocean going vessel for drag reduction purposes.

Invention also includes the method of dispersing a slurry within a liquid stream comprising the steps of providing a liquid stream within a conduit 14; radially annually ejecting a thin annular sheet of slurry within the liquid stream; turbulently mixing the annular sheet of slurry within the stream; and recovering the head of the mixed solution lost during the turbulent mixing.

It is now readily apparent that the present invention provides a very unique slurry dispenser which is inexpensive, compact and devoid of clogging problems at the ejection orifice. The present invention is especially useful in a submerged environment for producing extremely large quantities of polymer solution for reducing drag of ocean going vessels.

We claim:

1. A dispenser for ejecting slurry in a liquid stream comprising
   an elongated body having nose and main sections;
   the forward end of the main body section having an annular slurry receiving cavity which is located adjacent the nose;
   means mounting the nose to the main body section for longitudinal movement so as to open and close the annular cavity to the liquid stream; and
   the main body section having an annular exterior step decrease immediately aft of the noise so as to cause turbulence in the liquid,
   whereby slurry can be ejected and dispersed into the liquid stream when the annular cavity is opened.

2. A dispenser as claimed in claim 1 including:
   the main body section gradually decreasing in size immediately aft of the step decrease so as to act as a diffuser for recovering a portion of the head lost at the step increase.

3. A dispenser as claimed in claim 1 including:
   a conduit; and
   said elongated body being mounted in the conduit.

4. A dispenser as claimed in claim 3 including:
   a slurry delivery tube extending through the conduit and the main body section into the annular slurry receiving cavity.

5. A dispenser as claimed in claim 1 including:
   the main body section gradually decreasing in size immediately aft of the step decrease so as to act as a diffuser for recovering a portion of the head lost at the step increase.

6. A dispenser as claimed in claim 5 including:
   said annular slurry receiver cavity increasing in size toward the nose.

7. A dispenser as claimed in claim 6 including:
   a shaft rigidly and axially mounted to the nose and extending aft into the main body section;
   said main body section having an aft chamber which is divided from the annular slurry receiving cavity by an interior transverse partition;
   said shaft slidably and sealably extending through the transverse partition;
   said shaft having an enlarged aft end abutment for engaging the aft side of the partition so as to stop forward movement of the nose at a predetermined opened cavity position.

8. A dispenser as claimed in claim 7 including:
   a transverse plate spaced from the aft end of the shaft abutment and a compression spring disposed therebetween; and
   a bolt threaded through the plate and into the aft end of the abutment for selectively adjusting pressure required to force said nose forward and open the annular slurry receiving cavity.

9. A dispenser for ejecting slurry in a liquid stream comprising:
   an elongated body having a main section and a nose section;
   a forward portion of the main body section having a slurry receiving cavity which is located adjacent the aft end of the nose section;
   the aft end of the nose section being engagable with the forward end of the main section for closing the slurry receiving cavity from the liquid stream and being longitudinally separable from the forward end of the main section for providing an annular passageway which opens the slurry receiving cavity to the liquid stream;

means mounting the nose section to the main section for slidable forward and rearward longitudinal movement so as to enable opening and closing of the slurry receiving cavity to the liquid stream by the separation and engagement of the nose and main body sections, whereby slurry can be ejected and dispersed into the liquid stream when the nose section is separated from the main section.

10. A dispenser as claimed in claim 9 comprising: the slidable mounting means includes a shaft which is axially aligned with the longitudinal axis of the body; and means connected to the shaft for biasing the nose section to the closed position.

11. A dispenser as claimed in claim 9 including:
a conduit; and
said elongated body being mounted in the conduit.

12. A dispenser as claimed in claim 11 including:
a slurry delivery tube extending through the conduit and the main body section into the annular slurry receiving cavity.

* * * * *